Aug. 31, 1954

G. W. MOSHER 2,687,671

ADJUSTABLE SPECTACLE SHIELD FOR PROTECTING
THE EYES FROM INTENSE LIGHT AND GLARE
Filed May 5, 1950

INVENTOR.
GEORGE W. MOSHER
BY
Zugelter & Zugelter
Attys.

Patented Aug. 31, 1954

2,687,671

UNITED STATES PATENT OFFICE 2,687,671

ADJUSTABLE SPECTACLE SHIELD FOR PROTECTING THE EYES FROM INTENSE LIGHT AND GLARE

George W. Mosher, Cincinnati, Ohio

Application May 5, 1950, Serial No. 160,278

10 Claims. (Cl. 88—41)

1

This invention relates to eye glasses or spectacles and more particularly to spectacles provided with an improved protective device for the eyes of the wearer against bright light, such as sunlight, head lights, interior lighting and the like.

An object of this invention is to provide a device for protecting the eyes of the wearer against bright or glaring light, that shall be adjustable to one of two positions while being worn, in the one position the device being out of the normal line of sight and in the other in the normal line of sight.

Another object of the invention is to provide a device of the character referred to above that is so designed that when the device is in the normal line of sight position, the wearer may look through the device and utilize its glare protection function, or below it whereby the prevailing light intensity is not reduced and normal vision is not impaired.

A further object of the invention is to provide a device of the character referred to above that may be worn at all times by the wearer, it being so designed that whether it is in or out of the normal line of sight, protection is given against undesirable light rays impinging on the eyes from above the normal line of sight.

A still further object of the invention is to provide a protective device of the type referred to above that may be made as a removable attachment for eye glass frames or embodied in the frame construction of eye glass or spectacle frames as a permanent part thereof.

The above and other objects of the invention will be apparent to those skilled in the art from the following description taken in conjunction with the accompanying drawings in which.

2

Figure 1:
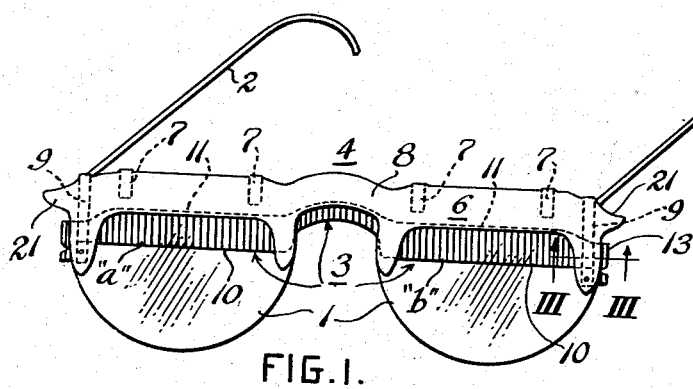
Figure 1 is a front perspective view of a protective device for the eyes, embodying the invention, the device being so constructed that it may be removably attached to a spectacle frame.
Figure 4:
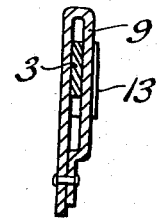
Figs. 3 and 4 are views in section taken on the lines III—III and IV—IV of Fig. 1.

Throughout the drawings and the specification like reference characters indicate like parts.

In Figs. 1, 2, 3, and 4 of the drawings a form of the invention is shown mounted in place on a pair of spectacles of the type comprising a pair of lenses 1 to which the nose-piece and the templets 2 are attached directly. The form of the invention as shown in these views, is designed to be removably attached to the spectacles, and comprises a transparent tinted strip 3 mounted in a frame 4. Strip 3 may be adjusted to a position where it is above the normal line of sight, that is above the center of lenses 1, or to a position where the strip is in the normal line of sight.

Frame 4 comprises a flat relatively narrow strip 6 whose length is approximately equal to the space between templets 2. On the rear of strip 6 are provided a plurality of clips 7 joined to the top edge of the strip. Clips 7 are in the nature of inverted hooks by means of which strip 6 may be hung on the spectacles, as shown. Clips 7 may be so formed that they yieldingly grip the spactacles. The middle portion of strip 6 may be formed with a nose piece or saddle-shaped portion 8 to conform to the bridge of the wearer's nose.

Adjacent each end of strip 6 is a retaining loop 9 through which the ends of tinted strip 3 extend as shown. Loops 9 and clips 7 may be made integral with the upper edge of strip 6. After strip 3 has been mounted in place, the lower ends of loops 9 may be riveted or otherwise secured to strip 6. Loops 9 may frictionally engage strip 3 so that it may be held in any adjusted position.

Figure 2:
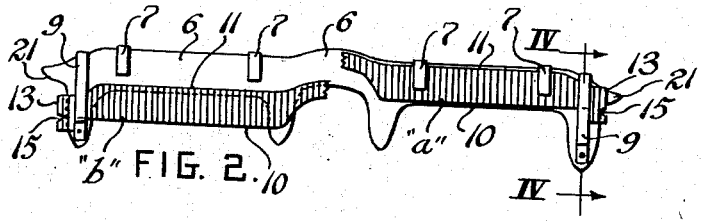
Fig. 2 is a rear view of the protective device shown in Fig. 1, the light absorbing element or shield thereof being shown broken at the center thereof whereby one-half may be shown in the normal line of sight position and the other in a position above or out of the normal line of sight.
Figure 3:

As may be seen in Figs. 1 and 2, the sections or portions *a* and *b* of strip 3 that extend across the lenses, have a straight, horizontal lower edge 10 and a substantially straight horizontal upper edge 11. The connecting section 12 between sections *a* and *b* is arched or curved upwardly to conform to the curvature of the bridge of a person's nose. The ends of the strip 3 may be formed with lugs or stops 13 that co-act with the outer edges of loops 9 to guide and retain the strip in its support frame 4. If desired, notches 15 may be provided in the ends of strip 3 to facilitate adjustment of the strip to its desired functional positions.

In Fig. 2, strip 3 is shown broken at the nose piece thereof so that section *a* may be shown in its raised position, i. e. in the position where it is out of the line of sight, and section *b* in the lowered position, i. e. in the line of sight.

When strip 3 is lowered and in the normal line of sight of both eyes, the lower straight edges of sections *a* and *b* thereof are approximately on or slightly above the horizontal axis of the lenses. In this position the wearer's eyes are protected from the bright rays of the sun or from bright lights, yet the lower portion of the lenses are unobstructed. The wearer may therefore look below the tinted sections *a* and *b* or through them depending on the position and angle of the object being viewed. For example, if the wearer is driving an automobile into the sun as at sunrise or at sunset, his eyes are protected by the tinted sections *a* and *b*. However, he may look below lower edges 10 and view the panel board of the car or objects near or far that are not in the glaring rays without looking through the tinted sections of strip 3. The protective device may be used safely for night driving whether or not sections *a* and *b* are in the line of sight because by raising the head slightly the vision is not impaired, yet protection is immediately available by raising the eyes or tilting the head slightly downward as though one were wearing bifocal lenses.

When there is no occasion for the protection of strip 3 it may be moved upwardly out of the line of sight in which position it is behind the transverse strip of frame 4 and substantially flush with the upper and lower edges thereof. Strip 3 need not be entirely behind frame strip 4 when raised to a position where it is out of the line of sight. Strip 3 need be raised only high enough for the lower edges 10 of sections *a* and *b* to be out of the line of sight. This condition is satisfied even though edges 10 are below the lower edge of frame strip 4, in which case a portion of each section *a* and *b* would be visible at all times.

A device such as shown in Figs. 1 to 4 may be worn by office workers who are exposed to glaring artificial light or who are sensitive to light reflected from the lenses into the eyes. When the device is worn for this purpose the wearer looks through the portions of the lenses below the lower edge of strip 3 while receiving the shade protection of strip 3.

Strip 3 may be made of transparent plastic tinted to the desired shade and depth of shade. The strip may, if desired, be constructed of material having "Polaroid" characteristics, that is, material that will polarize the light and thereby further reduce the effect of glare.

Figure 5:
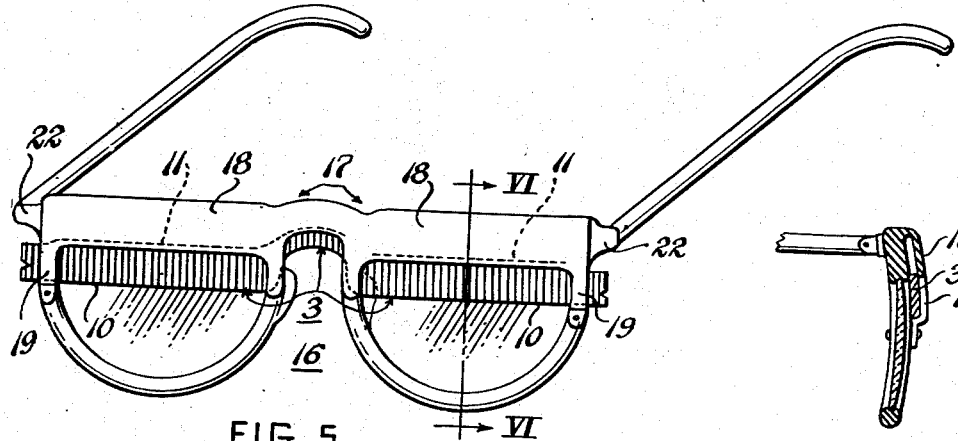
Fig. 5 is a front perspective view of spectacle frame in which the protective device is embodied as a permanent part thereof.
Figure 6:
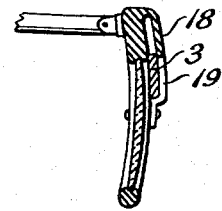
Fig. 6 is a view in section taken on line VI—VI of Fig. 5.

In Fig. 5, I have shown the protective device embodied in a spectacle frame 16 as a permanent part thereof. Frame 16 as illustrated, is of all-plastic type although it may be a metal frame, as well. Strip 3 is shown mounted in a frame 17 that is integral with frame 16. Frame 17 comprises a transverse strip 18 similar to the corresponding part of frame 4. Strip 18 is secured at its upper edge to the lens holders of frame 16 and projects forwardly of the lenses as shown in Fig. 6. At the opposite sides of the spectacle frame, the ends of strip 18 are extended downwardly to form retaining and guide loops 19 for strip 3. The lower ends of the loops may be riveted to the lens holder as shown.

When strip 3 is in its protecting position it extends across the lenses as shown. When strip 3 is in its raised position, it lies behind frame strip 18 with the lower edges of sections *a* and *b* thereof substantially flush with the lower edge of the frame strip.

As shown in Figs. 1, 2, and 5, respectively, the frame strips 4 and 18 may have projections 20 and 21 extending beyond the hinges of the temple of the spectacle frames that serve to conceal the ends of strips 3 when in their raised positions.

The device embodying this invention may be so designed that whether it is in the form of a removable attachment for existing spectacles, or as a permanent part of a spectacle frame, it is not unsightly and not particularly conspicuous. It may be so designed as to have a decorative and attractive appearance.

The form shown in Fig. 5 may be used with or without lenses in the spectacle frame. It may be used by baseball players and athletes who engage in outdoor games where protection from the sun is needed. A spectacle frame provided with the tinted strip 3 would protect a baseball player while at bat against a bright background, as well as the sun, without impairing normal visibility of the ball as it is delivered to him by the pitcher. Outfielders wearing my device would be protected from the bright sun when catching fly balls, and they would have normal, unimpaired vision of the ball as pitched to the batter because they can train their sight below the lower edge of strip 3. They are thereby enabled to keep their eyes on the ball as it travels from the pitcher to the catcher, an important point as it enables the fielders to start quickly when the ball is hit, in the direction of its flight.

Having thus described the invention, it will be apparent to those skilled in this art that modifications and changes may be made in the illustrative embodiments thereof without departing from either the spirit or the scope thereof.

Therefore, what is claimed as new and desired to be secured by Letters Patent is:

1. A device for protecting the eyes against bright light, comprising a spectacle frame having a tinted transparent strip disposed forwardly of the spectacle frame, loops of the nose piece of the spectacle frame for receiving supported at the sides of the frame for receiving and frictionally engaging the ends of the strip to support the same in positions to which adjusted when moved vertically from a lower to an upper position, said strip having sections disposed on opposite sides of the nose piece, each section having a substantially straight horizontal edge at the bottom thereof, the width of each said strip section being such that when the strip is in its lowermost position the strip sections are in the normal line of sight of the eye with the lower edges thereof substantially on the horizontal axis of the eyes of the wearer, and when in its uppermost position the strip is above said normal line of sight.

2. A device according to claim 1, characterized by the fact that the strip is flexible and that the spectacle frame is provided with a frame strip disposed forwardly of the transparent movable strip, the frame strip being at the top of the spectacle frame and of substantially the same shape and size as the transparent strip, whereby when the flexible transparent strip is in its uppermost position it is behind said frame strip.

3. A device according to claim 1, characterized by the fact that the strip is flexible and that the spectacle frame is provided with an opaque frame strip disposed forwardly of the transparent movable strip, the frame strip being at the top of the spectacle frame and of substantially the same shape and size as the transparent strip, whereby when the flexible transparent strip is in its uppermost position it is behind said frame strip.

4. An attachment for spectacles comprising a frame having a relatively narrow, transverse frame strip provided with means for removably securing the same to a spectacle frame at a location above the horizontal axis of the wearer's eyes, the length of said strip being approximately equal to the distance between the hinges of the templets of the spectacle frame, the width of the strip being such that the lowermost edge thereof is above the normal line of sight of the wearer, a transparent flexible tinted strip disposed behind the frame strip, the length and width of said tinted strip being approximately equal to the length and width of the frame strip, the frame strip having loops adjacent the ends thereof for frictionally engaging the tinted strip and supporting the same in the frame, the vertical length of the loops being approximately twice the width of the tinted strip whereby the tinted strip may be raised to a position where it lies behind the frame strip, and lowered to a position where substantially the full width of said transparent strip is exposed to the sight of the wearer.

5. A device according to claim 1, characterized by the fact that the ends of said tinted strip extend beyond the sides of the spectacle frame whereby the strip may be actuated by the wearer's fingers to or from the line of sight positions thereof.

6. An attachment according to claim 4, characterized by the fact that the frame strip is opaque.

7. An attachment according to claim 4, characterized by the fact that the frame strip is provided with inverted yieldable hooks extending rearwardly from the upper edge thereof adapted to yieldingly engage the top of spectacles as worn by the wear, and that the central portion of the frame strip is arched upwardly and shaped to conform generally to the shape of the bridge of the wearer's nose.

8. A device according to claim 4, characterized by the fact that the ends of said tinted strip extend beyond the sides of the spectacle frame whereby the strip may be actuated by the wearer's fingers to or from the line of sight positions thereof.

9. A device according to claim 1, characterized by the fact that the tinted strip is provided with a central portion that is shaped to conform approximately to the shape of the bridge of the wearer's nose.

10. An attachment according to claim 4, characterized by the fact that the lowermost edges of the portions of transparent tinted strip extending across the region of the eyes of the wearer are substantially straight and parallel to the horizontal axes of the eyes.

References Cited in the file of this patent

UNITED STATES PATENTS

| Number | Name | Date |
| --- | --- | --- |
| 1,495,828 | Weller | May 27, 1924 |
| 1,564,663 | Galligan | Dec. 8, 1925 |
| 1,650,236 | Rollins | Nov. 22, 1927 |
| 2,541,242 | Grove | Feb. 13, 1951 |

FOREIGN PATENTS

| Number | Country | Date |
| --- | --- | --- |
| 717,588 | France | Oct. 20, 1931 |